(12) United States Patent
Yoshida et al.

(10) Patent No.: US 9,541,192 B2
(45) Date of Patent: Jan. 10, 2017

(54) MOTOR CONTROL APPARATUS

(71) Applicant: DENSO CORPORATION, Kariya, Aichi-pref (JP)

(72) Inventors: Kazuhiro Yoshida, Tokoname (JP); Jun Yamada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/551,366

(22) Filed: Nov. 24, 2014

(65) Prior Publication Data
US 2015/0155803 A1    Jun. 4, 2015

(30) Foreign Application Priority Data
Nov. 29, 2013  (JP) .................................. 2013-247014

(51) Int. Cl.
| | | |
|---|---|---|
| *H02P 6/00* | (2016.01) | |
| *H02P 6/14* | (2016.01) | |
| *F16H 61/32* | (2006.01) | |
| *B60W 50/00* | (2006.01) | |
| *F16H 61/12* | (2010.01) | |

(52) U.S. Cl.
CPC .............. *F16H 61/32* (2013.01); *B60W 50/00* (2013.01); *F16H 61/12* (2013.01); *F16H 2061/1268* (2013.01); *F16H 2061/326* (2013.01); *H02P 6/14* (2013.01)

(58) Field of Classification Search
CPC .... F16H 61/32; F16H 6/12; F16H 2061/1268; F16H 2061/326; B60W 50/00; H02P 6/14
USPC ........ 318/400.02, 400.01, 811, 400.2, 400.1, 318/700; 307/106; 327/100–336; 388/915; 701/1, 52, 55, 56, 68
See application file for complete search history.

(56) References Cited

U.S. PATENT DOCUMENTS 4,087,854 A * 5/1978 Kinoshita ........... G06F 15/7832
708/190
4,905,786 A * 3/1990 Miyake ................ B60K 31/107
180/176
4,953,590 A * 9/1990 Kakinuma .............. F02D 41/20
137/554

(Continued)

FOREIGN PATENT DOCUMENTS

| | | |
|---|---|---|
| JP | 2002-281778 | 9/2002 |
| JP | 2002281778 A * | 9/2002 ................ H02P 5/00 |

OTHER PUBLICATIONS

Office Action (3 pages) dated Sep. 25, 2015, issued in corresponding Japanese Application No. 2013-247014 and English translation (4 pages).

*Primary Examiner* — Rita Leykin
(74) *Attorney, Agent, or Firm* — Nixon & Vanderhye P.C.

(57) ABSTRACT

A motor control apparatus includes a by-wire control circuit for sequentially switching an energized phase of a motor. The by-wire control circuit pre-stores a first table defining an energized phase address corresponding to each address and a second table defining an energized phase corresponding to each energized phase address. When receiving a drive permission code from a second control circuit, the by-wire control circuit switches the energized phase in a correct order of driving the motor, by calculating an address for access to the first table based on the drive permission code, calculating an energized phase address corresponding to the address by referring to the first table, and determining the energized phase corresponding to the energized phase address by referring to the second table.

10 Claims, 13 Drawing Sheets

(56) References Cited

U.S. PATENT DOCUMENTS

| | | | | |
|---|---|---|---|---|
| 4,994,950 A * | 2/1991 | Gritter | .............. | H02M 7/53873 |
| | | | | 318/811 |
| 6,121,744 A * | 9/2000 | Hoda | ........................ | H02P 8/18 |
| | | | | 318/671 |
| 6,848,061 B2 * | 1/2005 | Kawase | ............. | G05B 19/4142 |
| | | | | 710/22 |
| 8,401,747 B2 * | 3/2013 | Ito | ........................... | F16H 61/12 |
| | | | | 701/51 |
| 8,577,574 B2 * | 11/2013 | Ueno | ................... | B60T 8/1708 |
| | | | | 701/70 |
| 8,620,537 B2 * | 12/2013 | Kashiwagi | .............. | F16H 61/32 |
| | | | | 701/51 |
| 2006/0271260 A1 | 11/2006 | Matsuzaki et al. | | |
| 2008/0197791 A1 * | 8/2008 | Imai | ........................ | B60K 6/445 |
| | | | | 318/8 |
| 2008/0215215 A1 | 9/2008 | Kashiwagi | | |

\* cited by examiner

FIG. 4

TABLE X

| ADDRESS | ENE-PHASE ADDRESS |
|---|---|
| 0x*00 | 0x*10 |
| 0x*01 | 0x*12 |
| 0x*02 | 0x*15 |
| 0x*03 | 0x*17 |
| 0x*04 | 0x*18 |
| 0x*05 | 0x*1A |
| 0x*06 | 0x*11 |
| 0x*07 | 0x*13 |
| 0x*08 | 0x*14 |
| 0x*09 | 0x*16 |
| 0x*0A | 0x*19 |
| 0x*0B | 0x*1B |

FIG. 5

TABLE Y (1st EX)

| ENE-PHASE PATTERN NO. | ENE-PHASE ADDRESS | ENE-PHASE | | |
|---|---|---|---|---|
| | | U-PHASE | V-PHASE | W-PHASE |
| 0 | 0x***00 | ON | OFF | ON |
| 6 | 0x***11 | OFF | ON | OFF |
| 1 | 0x***12 | ON | OFF | ON |
| 7 | 0x***13 | OFF | ON | OFF |
| 8 | 0x***14 | OFF | ON | ON |
| 2 | 0x***15 | ON | OFF | OFF |
| 9 | 0x***16 | OFF | ON | ON |
| 3 | 0x***17 | ON | OFF | OFF |
| 4 | 0x***18 | ON | ON | OFF |
| 10 | 0x***19 | OFF | OFF | ON |
| 5 | 0x***1A | ON | ON | OFF |
| 11 | 0x***1B | OFF | OFF | ON |

FIG. 6

TABLE Y (2nd EX)

| ENE-PHASE PATTERN NO. | ENE-PHASE ADDRESS | ENE-PHASE | | |
|---|---|---|---|---|
| | | U-PHASE | V-PHASE | W-PHASE |
| 2 | 0x***10 | ON | OFF | OFF |
| 3 | 0x***11 | ON | OFF | OFF |
| 6 | 0x***12 | OFF | ON | OFF |
| 7 | 0x***13 | OFF | ON | OFF |
| 10 | 0x***14 | OFF | OFF | ON |
| 11 | 0x***15 | OFF | OFF | ON |
| 8 | 0x***16 | OFF | ON | ON |
| 9 | 0x***17 | OFF | ON | ON |
| 4 | 0x***18 | ON | ON | OFF |
| 5 | 0x***19 | ON | ON | OFF |
| 1 | 0x***1A | ON | OFF | ON |
| 0 | 0x***1B | ON | OFF | ON |

FIG. 7

TABLE Y (3rd EX)

| ENE-PHASE PATTERN NO. | ENE-PHASE ADDRESS | ENE-PHASE | | |
|---|---|---|---|---|
| | | U-PHASE | V-PHASE | W-PHASE |
| 0 | 0x***10 | ON | OFF | ON |
| 1 | 0x***12 | ON | OFF | ON |
| 6 | 0x***11 | OFF | ON | OFF |
| 7 | 0x***13 | OFF | ON | OFF |
| 8 | 0x***14 | OFF | ON | ON |
| 9 | 0x***16 | OFF | ON | ON |
| 2 | 0x***15 | ON | OFF | OFF |
| 3 | 0x***17 | ON | OFF | OFF |
| 4 | 0x***18 | ON | ON | OFF |
| 5 | 0x***1A | ON | ON | OFF |
| 10 | 0x***19 | OFF | OFF | ON |
| 11 | 0x***1B | OFF | OFF | ON |

FIG. 8

TABLE Y (4th EX)

| ENE-PHASE PATTERN NO. | ENE-PHASE ADDRESS | ENE-PHASE | | |
|---|---|---|---|---|
| | | U-PHASE | V-PHASE | W-PHASE |
| STOP | 0x***10 | ON | ON | ON |
| 2 | 0x***11 | ON | OFF | OFF |
| STOP | 0x***12 | ON | ON | ON |
| 3 | 0x***13 | ON | OFF | OFF |
| STOP | 0x***14 | ON | ON | ON |
| 6 | 0x***15 | OFF | ON | OFF |
| STOP | 0x***16 | ON | ON | ON |
| 7 | 0x***17 | OFF | ON | OFF |
| STOP | 0x***18 | ON | ON | ON |
| 10 | 0x***19 | OFF | OFF | ON |
| STOP | 0x***1A | ON | ON | ON |
| 11 | 0x***1B | OFF | OFF | ON |
| STOP | 0x***1C | ON | ON | ON |
| 8 | 0x***1D | OFF | ON | ON |
| STOP | 0x***1E | ON | ON | ON |
| 9 | 0x***1F | OFF | ON | ON |
| STOP | 0x***20 | ON | ON | ON |
| 4 | 0x***21 | ON | ON | OFF |
| STOP | 0x***22 | ON | ON | ON |
| 5 | 0x***23 | ON | ON | OFF |
| STOP | 0x***24 | ON | ON | ON |
| 1 | 0x***25 | ON | OFF | ON |
| STOP | 0x***26 | ON | ON | ON |
| 0 | 0x***27 | ON | OFF | ON |

FIG. 9

TABLE Y (5th EX)

| ENE-PHASE PATTERN NO. | ENE-PHASE ADDRESS | ENE-PHASE | | |
|---|---|---|---|---|
| | | U-PHASE | V-PHASE | W-PHASE |
| 0 | 0x00011 | ON | OFF | ON |
| 1 | 0x00101 | ON | OFF | ON |
| 2 | 0x00110 | ON | OFF | OFF |
| 3 | 0x01001 | ON | OFF | OFF |
| 4 | 0x01010 | ON | ON | OFF |
| 5 | 0x01100 | ON | ON | OFF |
| 6 | 0x10001 | OFF | ON | OFF |
| 7 | 0x10010 | OFF | ON | OFF |
| 8 | 0x10100 | OFF | ON | ON |
| 9 | 0x10111 | OFF | ON | ON |
| 10 | 0x11000 | OFF | OFF | ON |
| 11 | 0x11101 | OFF | OFF | ON |

FIG. 10

TABLE X FOR DRIVE PROHIBITION

| ADDRESS | ENE-PHASE ADDRESS |
|---|---|
| 0x*00 | 0x010 |
| 0x*01 | 0x012 |
| 0x*02 | 0x015 |
| 0x*03 | 0x017 |
| 0x*04 | 0x018 |
| 0x*05 | 0x01A |
| 0x*06 | 0x011 |
| 0x*07 | 0x013 |
| 0x*08 | 0x014 |
| 0x*09 | 0x016 |
| 0x*0A | 0x019 |
| 0x*0B | 0x01B |

FIG. 11

TABLE Y (1st EX) FOR DRIVE PROHIBITION

| ENE-PHASE PATTERN NO. | ENE-PHASE ADDRESS | ENE-PHASE | | |
|---|---|---|---|---|
| | | U-PHASE | V-PHASE | W-PHASE |
| 0 | 0x**010 | OFF | OFF | OFF |
| 6 | 0x**011 | OFF | OFF | OFF |
| 1 | 0x**012 | OFF | OFF | OFF |
| 7 | 0x**013 | OFF | OFF | OFF |
| 8 | 0x**014 | OFF | OFF | OFF |
| 2 | 0x**015 | OFF | OFF | OFF |
| 9 | 0x**016 | OFF | OFF | OFF |
| 3 | 0x**017 | OFF | OFF | OFF |
| 4 | 0x**018 | OFF | OFF | OFF |
| 10 | 0x**019 | OFF | OFF | OFF |
| 5 | 0x**01A | OFF | OFF | OFF |
| 11 | 0x**01B | OFF | OFF | OFF |

FIG. 12

TABLE Y (2nd EX) FOR DRIVE PROHIBITION

| ENE-PHASE PATTERN NO. | ENE-PHASE ADDRESS | ENE-PHASE | | |
|---|---|---|---|---|
| | | U-PHASE | V-PHASE | W-PHASE |
| 0 | 0x**010 | ON | ON | ON |
| 6 | 0x**011 | ON | ON | ON |
| 1 | 0x**012 | ON | ON | ON |
| 7 | 0x**013 | ON | ON | ON |
| 8 | 0x**014 | ON | ON | ON |
| 2 | 0x**015 | ON | ON | ON |
| 9 | 0x**016 | ON | ON | ON |
| 3 | 0x**017 | ON | ON | ON |
| 4 | 0x**018 | ON | ON | ON |
| 10 | 0x**019 | ON | ON | ON |
| 5 | 0x**01A | ON | ON | ON |
| 11 | 0x**01B | ON | ON | ON |

MOTOR CONTROL APPARATUS

CROSS REFERENCE TO RELATED APPLICATION

The present application is based on Japanese Patent Application No. 2013-247014 filed on Nov. 29, 2013, disclosure of which is incorporated herein by reference.

TECHNICAL FIELD

The present disclosure relates to a motor control apparatus for sequentially switching an energized phase of a motor to drive rotation of the motor serving as a drive source of a vehicle-mounted apparatus.

BACKGROUND

In recent years, in order to meet needs for space saving, assembility improvement, controllability improvement and the like of automobiles, there is an increasing tendency to change a mechanical drive system into a by-wire system, in which electrical driving is performed with a motor.

Such a by-wire system is described in, for example, Patent Document 1 (JP 2006-336691A). In Patent Document 1, based on predetermined monitor information, the by-wire system is monitored by a monitor control circuit, which is provided separately from a by-wire control circuit for controlling a motor serving as a drive source. When the monitor control circuit confirms an abnormality of the by-wire system, the control of the motor by the by-wire control circuit is prohibited (e.g., turning off a switch to prohibit the energization of the motor).

In the technology of Patent Document 1, the control of the motor is merely prohibited when the monitor control circuit confirms an abnormality of the by-wire system based on the predetermined monitor information. Thus, there is a possibility that it is difficult to sufficiently enhance safety in case of a system abnormality (e.g., generation of an abnormal signal due to noise, power supply voltage reduction or the like).

There is a system which includes a by-wire control circuit for driving rotation of a motor by sequentially switching the energized phase of the motor, and which switches the energized phase of the motor in a correct order in the following way. The by-wire control circuit pre-stores a table in which energized phases corresponding to respective energized phase pattern numbers are arranged in the correct order. When the by-wire control circuit drives the rotation of the motor, the by-wire control circuit refers to this table to determine the energized phase corresponding to the energized phase pattern number, thereby switching the energized phase of the motor in the correct order.

In such a system, in case that an abnormality sequentially incrementing the energized pattern number one-by-one occurs due to a RAM garbling (data garbling by RAM abnormality) or the like, there is a possibility that the abnormality switches the energized phase in the correct order of driving the rotation of the motor.

SUMMARY

In view of the foregoing, it is an object of the present disclosure provide a motor control apparatus in a system which drives rotation of a motor by sequentially switching an energized phase of the motor, in order to improve safety in case of system abnormality.

According to an example of the present disclosure, a motor control apparatus comprises a motor as a drive source of a vehicle-mounted apparatus, a by-wire control circuit provided as a first control circuit for sequentially switching an energized phase of the motor to drive rotation of the motor, and a second control circuit for transmitting a drive permission code to the by-wire control circuit when driving of the rotation of the motor is permitted. The by-wire control circuit and the second control circuit are different circuits. The by-wire control circuit pre-stores a first table defining an energized phase address corresponding to each address and a second table defining an energized phase corresponding to each energized phase address. When receiving the drive permission code, the by-wire control circuit switches the energized phase in a correct order of driving the rotation of the motor, by: calculating an address for access to the first table based on the drive permission code; calculating an energized phase address corresponding to the address by referring to the first table, thereby to calculate the energized phase address for access to the second table in the correct order; and determining the energized phase corresponding to the energized phase address by referring to the second table.

In the above configuration, when the driving of the motor is not permitted by the second control circuit. i.e., when the drive permission code is not transmitted from the second control circuit to the by-wire control circuit, the by-wire control circuit cannot calculate the address for access to the first table X. Accordingly, the by-wire control circuit cannot calculate the energized phase address for access to the second table and thus cannot determines the energized phase and cannot drive the rotation of the motor. Therefore, it becomes possible to remarkably reduce a possibility that the rotation of the motor is driven when the driving of the motor is not permitted by the second control circuit.

Moreover, in the above configuration, the energized phase address for access to the second table in the correct order is calculated through referring to the first table. Thus, even when occurrence of an abnormality due to a garbled RAM (garbled data in the RAM) or the like sequentially increments the energized pattern address one-by-one, it becomes possible to prevent the abnormality from causing the access to the second table in the correct order. Accordingly, even when an occurrence of an abnormality sequentially increments the energized pattern address one-by-one, it becomes possible to prevent the abnormality from switching the energized phase in the correct order of driving the rotation of the motor. Safety in case of system abnormality is improved.

BRIEF DESCRIPTION OF THE DRAWINGS

The above and other objects, features and advantages of the present disclosure will become more apparent from the following detailed description made with reference to the accompanying drawings. In the drawings:

FIG. 4 is a diagram illustrating an example of a table X;

FIG. 5 is a diagram illustrating a first example of the table Y;

FIG. 6 is a diagram illustrating a second example of the table Y;

FIG. 7 is a diagram illustrating a third example of the table Y;

FIG. 8 is a diagram illustrating a fourth example of the table Y;

FIG. 9 is a diagram illustrating a fifth example of the table Y;

FIG. 10 is a diagram illustrating an example of a table X for driving prohibition;

FIG. 11 is a diagram illustrating a first example of the table Y for driving prohibition;

FIG. 12 is a diagram illustrating a second example of the table Y for driving prohibition;

DETAILED DESCRIPTION

Figure 1:
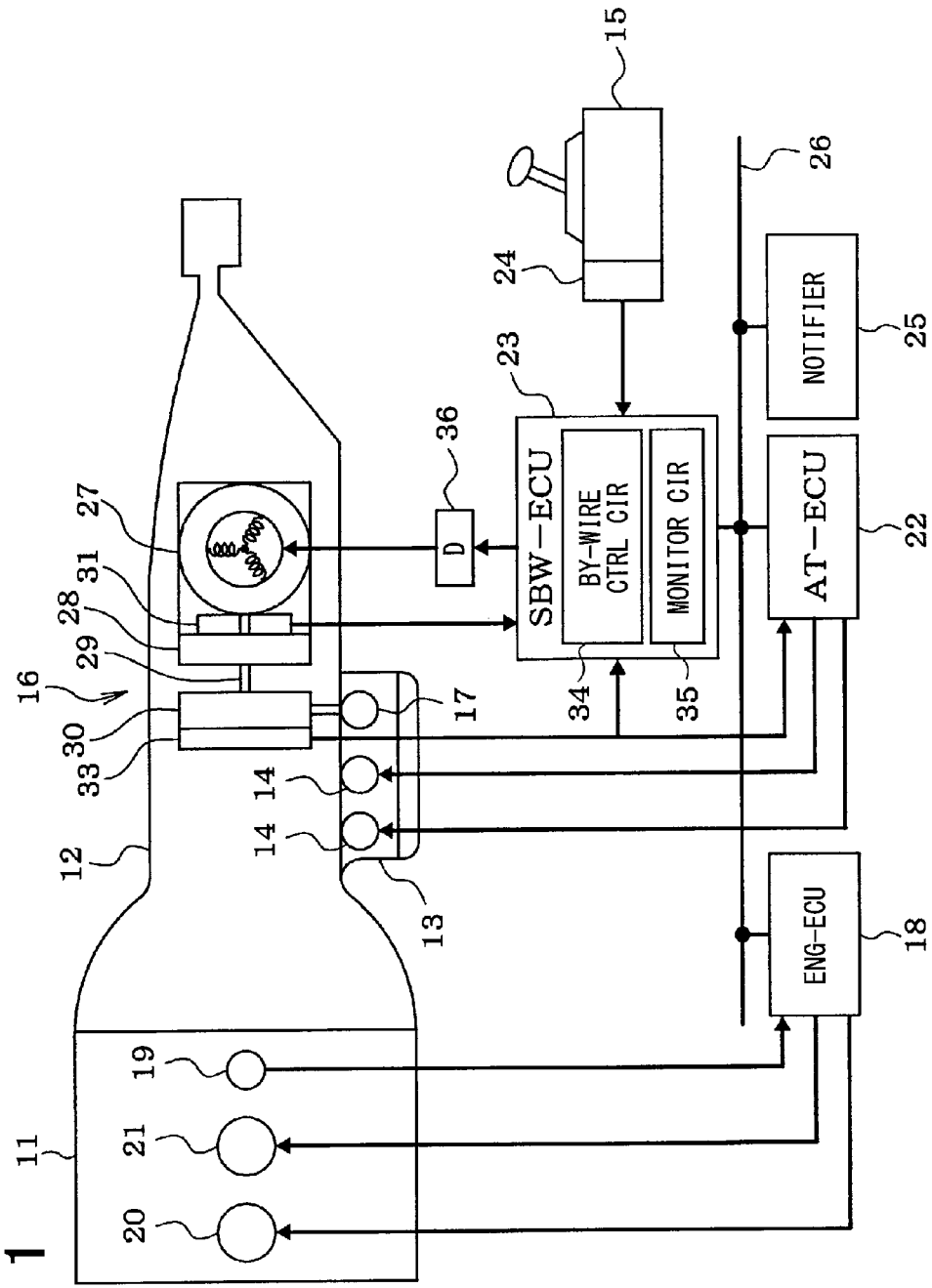
FIG. 1 is a diagram illustrating an outline configuration of an automatic transmission control system in one embodiment.

One embodiment will be described. A schematic configuration of an automatic transmission control system will be described based on FIG. 1. An output shaft (crankshaft) of an engine 11 is connected to an input shaft of an automatic transmission 12. The automatic transmission 12 includes a transmission gear mechanism (not shown) and an oil-pressure (hydraulic) control circuit 13. The transmission gear mechanism includes friction engagement elements (not shown) such as multiple clutches, a brake and the like for switching over transmission level (gear ratio). The oil pressure control circuit 13 includes an oil pressure control valve 14 for controlling the oil pressure applied to the friction engagement element, and a manual valve 17 for switching a hydraulic circuit of hydraulic fluid of the friction engagement element. This manual valve 17 is driven by the range switchover apparatus 16 in conjunction with an operation of a range selector 15.

An engine ECU 18 controls the engine 11. Specifically, the engine ECU 18 controls a throttle opening of a throttle device 20 (an opening degree of a throttle value), an fuel injection amount of a fuel injection valve 21 or the like based on an output signal of an accelerator sensor 19 detecting accelerator position (an operation amount of accelerator pedal) or the like. In the present disclosure, the ECU refers to an electronic control unit.

An AT-ECU 22 controls a gear shift operation of the automatic transmission 12. Specifically, the AT-ECU 22 controls opening and closing operations of each oil pressure control valve 14 of the oil pressure control circuit 13 to control the oil pressure supplied to each friction engagement element, thereby switching over a gear ratio of the automatic transmission 12 into a target gear ratio.

A SBW-ECU 23 controls the range switch operation of the automatic transmission 12. The SBW-ECU 23 controls the motor 27 of the range switchover apparatus 16 based on an output signal of a selector sensor 24 detecting the range selected with the range selector 15, thereby controlling the switchover operation of the manual valve 17 in accordance with the range switchover operation of a driver and switching over the shift range of the automatic transmission 12. The range switchover apparatus 16, the SBW-ECU 23 etc. constitute a shift-by-wire system.

The engine ECU 18, the AT-ECU 22, the SBW-ECU 23, and a notification apparatus 25 and the like are connected via a communication line 26 (e.g., in-vehicle LAN etc.) to exchange necessary information each other by CAN communications or the like.

Figure 2:
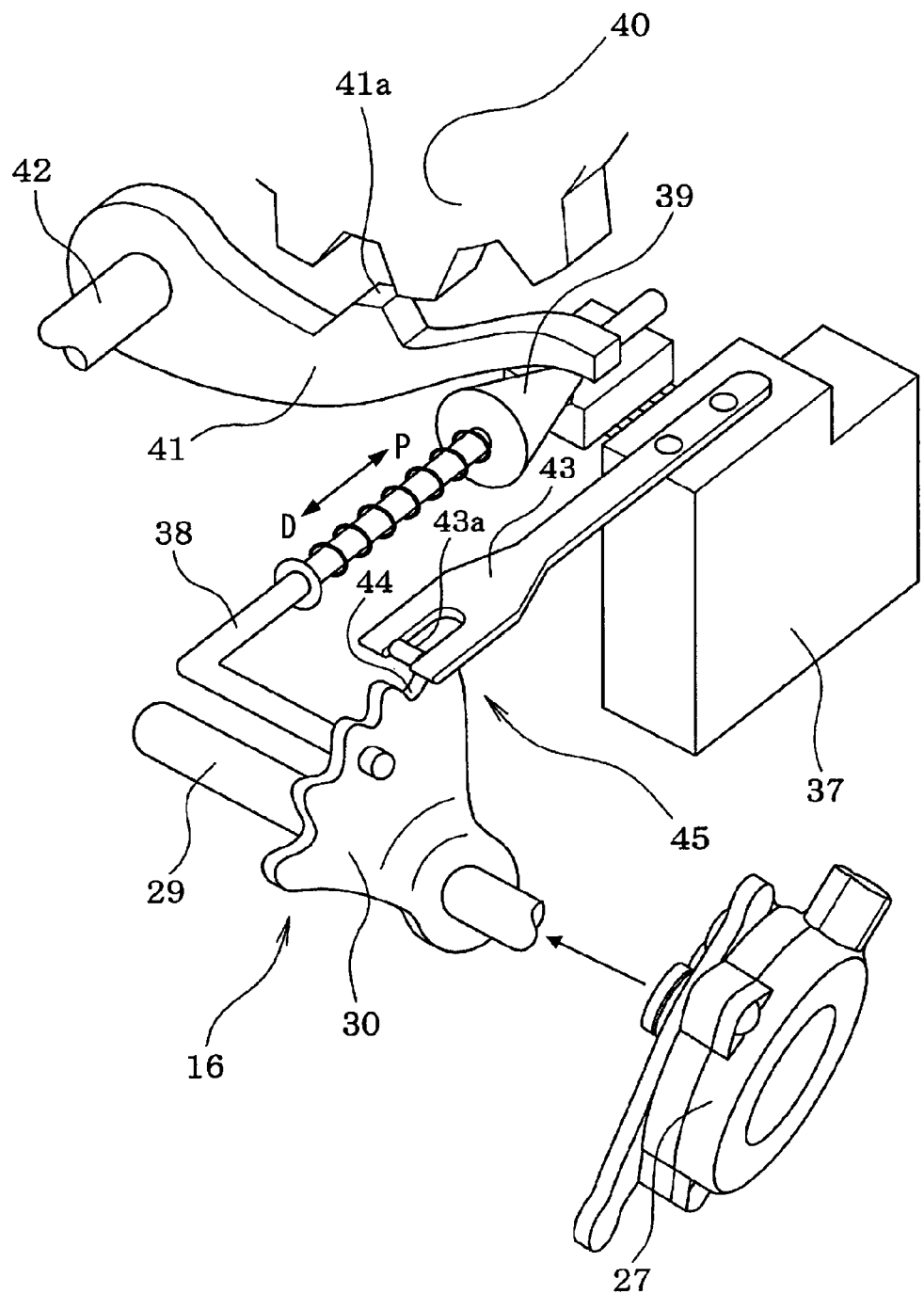
FIG. 2 is a perspective diagram illustrating a range switchover apparatus.

As shown in FIG. 2, the range switchover apparatus 16 switches over the shift range of the automatic transmission 12. The range switchover apparatus 16 may be a four-position type range switchover apparatus, which switches over the shift range among a P (parking) range, a R (reverse) range, an N (neutral) range, and a D (drive) range. The motor 27 serving as the drive source of this range switchover apparatus 16 may be, for example, a switched reluctance motor. A rotation axis of this motor 27 is connected with a manual shaft 29 through a speed reducer mechanism 28 (refer to FIG. 1). A detent lever 30 is fixed to this manual shaft 29. A manual valve 17 (refer to FIG. 1), which linearly move according to rotation of the detent lever 30, is connected to the detent lever 30. The shift range is switched over by switching the hydraulic circuit of the automatic transmission 12 by this manual valve 17. Because of the above configuration, the shift range of the automatic transmission 12 is controllable according to rotation angle of the motor 27.

A parking rod 38 having a L shape is fixed to the detent lever 30. A circular cone body 39 provided at a tip of the parking rod 38 abuts a lock lever 41. This lock lever 41 moves up and down around an axis 42 according to position of the circular cone body 39 to lock and unlock a parking gear 40. The parking gear 40 is provided to an output shaft of the automatic transmission 12. When the parking gear 40 is locked by the lock lever 41, the driving wheel of the vehicle is maintained at a rotation-prevention state (parking state).

A detent spring 43 for holding the detent lever 30 in each of P, R, N, D ranges is fixed to a support base 37. The detent lever 30 is formed with a holding recession 44 for each of P, R, N, D ranges. When an engagement part 43a provided at a tip of the detent spring 43 fits into the holding recession 44, the detent lever 30 is held at position for each of P, R, N, D ranges. The detent lever 30, the detent spring 43 etc. constitute a detent mechanism 45 for engaging and holding the rotation position of the detent lever 30 (for holding the range switchover apparatus 16 at the position for each range).

For the P range, the parking rod 38 moves in a direction to approach the lock lever 41, and a thick portion of the circular cone body 39 pushes up the lock lever 41 to fit a convex portion 41a into the parking gear 40, so that the parking gear 40 is in a locked state. In this way, the output shaft (driving wheel) of the automatic transmission 12 is hold at the locked state (parking state).

For ranges other than P range, the parking rod 38 moves in a direction away from the lock lever 41, and the thick portion of the circular cone body 39 moves out of the lock lever 41 and the lock lever 41 moves down. Accordingly, the convex portion 41a of the lock lever 41 separates from the parking gear 40 to release the lock of the parking gear 40, so that the output shaft of the automatic transmission 12 is hold at a rotatable state (travelable state).

As shown in FIG. 1, the motor 27 is provided with an encoder 31 as a rotation sensor for detecting a rotation angle (rotation position) of a rotor. The encoder 31 may be, for example, a magnetic-type rotary encoder. In synchronization with rotation of the rotor of the motor 27, the encoder 31 outputs a pulse signal to the SBW-ECU 23 at each predetermined angel. The SBW-ECU 23 counts the pulse signal of the encoder 31. In accordance with this count value, the SBW-ECU 23 switches the energized phase of the motor 27 in a predetermined order, thereby driving the rotation of the motor 27. Because the shift range of the automatic transmission 12 changes according to the rotation angle of the motor 27 as mentioned above, the encoder counted value indirectly represents an actual shift range.

The rotational angle sensor 33 detects the rotation angle (rotation position) of the manual shaft 29 or the detent lever 30. This rotation angle sensor 33 includes a sensor (e.g., potentiometer) for outputting a voltage that depends on the rotation angle of the manual shaft 29 or the detent lever 30. Based on the outputted voltage, it is confirmable whether the actual shift range is the P range, the R range, the N range, or the D range. The selector sensor 24 detects a command value of the range selected by the driver with a range selector 15 and outputs a detection signal (also called a command angel signal) to the SBW-ECU 23. The range selector 15 may be a lever type range selector, a button type range selector, or the like.

The SBW-ECU 23 includes a by-wire control circuit 34 and a monitor circuit 35. The by-wire control circuit 34 performs electrical control of the motor 27 serving as the drive source of the range switchover apparatus 16. The monitor circuit 35 is a second control circuit different from the by-wire control circuit 34 (first control circuit) and monitors whether or not the by-wire control circuit 34 is normally operating. The by-wire control circuit 34 is provided with a microcomputer or the like. The monitor circuit 35 is provided with an IC (e.g., ASIC) or the like. A drive prohibition device 36 (described as D in FIG. 1) for prohibiting the driving of the motor 27 is provided between SBW-ECU 23 and the motor 27 of the range switchover apparatus 16.

In the SBW-ECU 23, the by-wire control circuit 34 determines whether the driving of the motor 27 is to be permitted or prohibited. When the permission of the driving of the motor 27 is not determined by the by-wire control circuit 34, the drive prohibition device 36 prohibits the motor 27 from being driven. Furthermore, in the SBW-ECU 23, the monitor circuit 35 monitors whether or not the by-wire control circuit 34 is normally operating. When it is determined that the by-wire control circuit 34 is not normally operating, the drive prohibition device 36 prohibits the motor 27 from being driven.

The engine ECU 18 (also called a second control circuit and a different control circuit) transmits a drive permission code to the by-wire control circuit 34 of the SBW-ECU 23 when the drive of the motor 27 is permitted. The engine ECU 18 transmits a drive prohibition code to the by-wire control circuit 34 of the SBW-ECU 23 when the drive of the motor 27 is prohibited. Redundant codes (e.g., 0x5AA5, 0xF00F) are used as the drive permission code and the drive prohibition code. Their reliability is checked by check-sum, message counter or the like.

Figure 13:
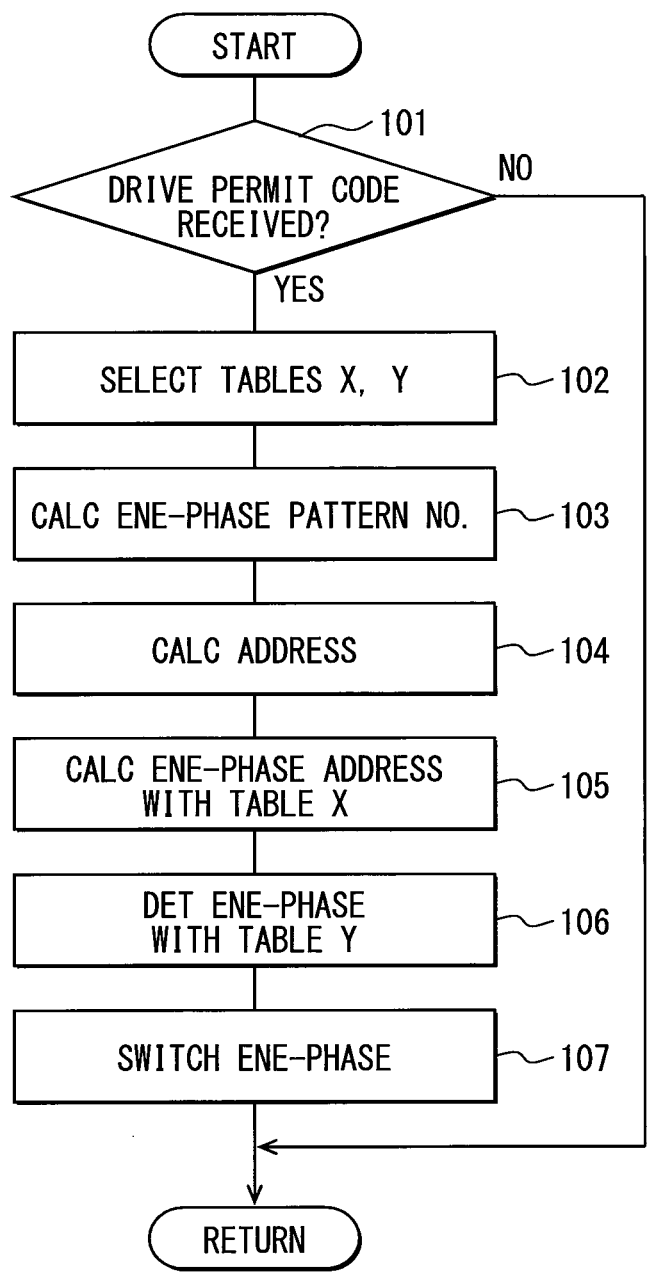
FIG. 13 is a flowchart illustrating an energized phase setting routine.

The by-wire control circuit 34 of the SBW-ECU 23 performs the below-described energized phase setting routine, which is illustrated in FIG. 13. Thereby, the by-wire control circuit 34 sequentially switches the energized phase of the motor 27 to drive the rotation of the motor 27.

A setting method of the energized phase by the by-wire control circuit 34 will be explained. The ROM (not shown) of the by-wire control circuit 34 pre-stores a table X (refer to FIG. 4) and a table Y (refer to FIG. 5). The table X specifies the energized phase address corresponding to respective addresses. The table Y specifies the energized phases corresponding to respective energized phase addresses.

Figure 3:
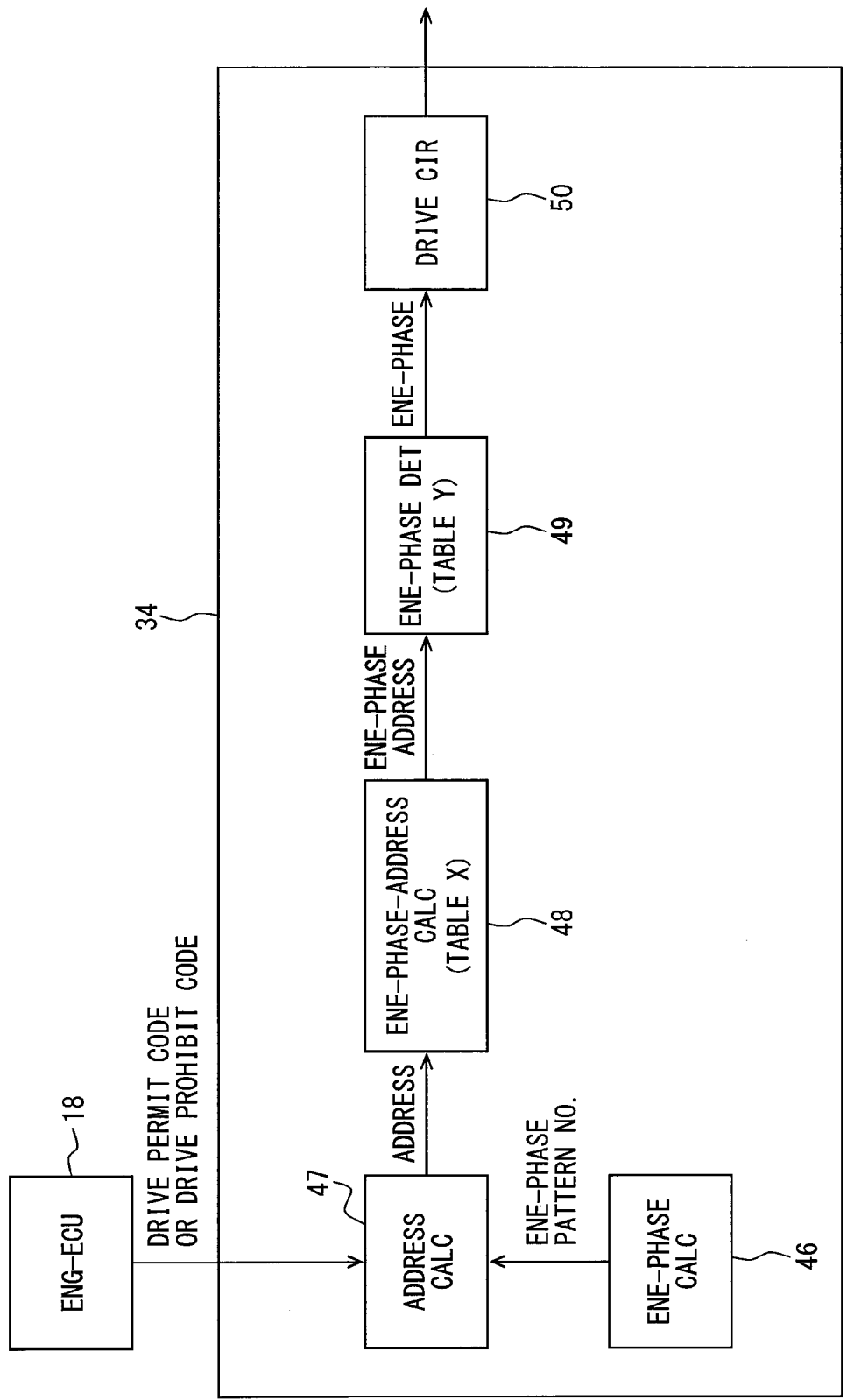
FIG. 3 is a block diagram schematically illustrating an energized phase setting function.

As shown in FIG. 3, when the drive permission code (e.g., 0x5AA5) is received, an energized phase operation part 46 of the by-wire control circuit 34 calculates an energized phase pattern No. (energized phase pattern number).

Specifically, when the motor 27 is rotated in a forward direction, the energized phase No. is increased one-by-one (for example, when the energized phase No. reaches 11, it returns to 0). When the motor 27 is rotated in a reverse direction, and, the energized phase No. is decreased one-by-one (for example, when the energized phase No. reaches 0, it returns to 11).

Thereafter, based on the drive permission code and the energized phase pattern No., an address calculation part 47 calculates the address for access to the table X, by using one of or both of four arithmetic operations and a logical operation. In the present embodiment, the address calculation part 47 obtains the address by adding the drive permission code and a constant to the energized phase pattern No., expressed as:

the address=the energized phase pattern No.+the drive permission code+a constant.

A calculation method of the address can be modified on an as-needed basis.

Thereafter, an energized phase address calculation part 48 refers to the table X and calculates the energized phase address corresponding to this time address. The table X (refer to FIG. 4) is arrayed so that the energized phase addresses are arranged not in a consecutive order but in an order that enables access to the table Y in the correct order. Therefore, by calculating the energized phase address using the table X, the energized phase address calculation part 48 can calculate the energized phase address for access to the table Y in the correct order.

Thereafter, with reference to the table Y, an energized phase determination part 49 determines the energized phase corresponding to the energized phase address calculated this time. The table Y (refer to FIG. 5) is arrayed so that the energized phases are arranged not in the correct order of driving rotation of the motor 27. Rather, the table Y is arrayed so that the energized phases are arranged in the correct order of driving the rotation of the motor 27 when they are accessed in an order of the energized phase addresses calculated using the table X.

After the energized phase is determined in the above way, the drive circuit 50 switches the energized phase of the motor 27 into the energized phase determined this time. This switches the energized phase in the correct order of driving the rotation of the motor 27.

In the present embodiment, the table Y is arrayed so that the energized phases are arranged in a failsafe usage order, which is different from the correct order of driving the rotation of the motor 27. In this configuration, even when an abnormality causing the energized phase address to be incremented one-by-one occurs, the energized phases are switched in the failsafe usage order, so that a resultant operation of the motor 27 is an operation for failsafe.

Specifically, as shown in FIG. 5, in the table Y, the energized phases are arranged in such a failsafe usage order that the energized phase patterns generally in anti-phase (i.e., energization ON and energization OFF are reversed between the energized phase patterns) are adjacent to each other. In this configuration, in case that an abnormality causing the energized phase address to be incremented one-by-one occurs, the torque generation of the motor 27 is suppressed. Thus, it becomes possible to prevent the operation of the motor 27 from falling into a fatal mode (i.e., a mode which switches over the shift range).

The failsafe usage order is not limited to the above example and can be modified in various ways. For example, as shown in FIG. 6, the energized phases in the table Y may be arranged in such a failsafe usage order that the motor 27 oscillates in forward and reverse directions. In this configuration, in case that an abnormality causing the energized phase address to be incremented one-by-one occurs, the motor 27 oscillates in forward and reverse directions and does not rotate by a given angle or more. Thus, it becomes possible to prevent the operation of the motor 27 from being in the fatal mode.

Alternatively, as shown in FIG. 7, the energized phases in the table Y may be arranged in such a failsafe usage order that the motor 27 slightly rotates in a safe-side direction (e.g., P-range direction). In this configuration, in case that an abnormality causing the energized phase address to be incremented one-by-one occurs, the motor 27 slightly rotates in a safe-side direction. Thus, it becomes possible to prevent the operation of the motor 27 from being in a fatal mode.

Alternatively, as shown in FIG. 8, the energized phases in the table Y may be arranged in such a failsafe usage order that an all-phase-energization (i.e., the energized phase pattern in which all the phases are energization ON) is inserted in the energized phases arranged in the correct order of driving the rotation of the motor 27. In this configuration, in case that an abnormality causing the energized phase address to be incremented one-by-one occurs, the rotation of motor 27 is braked. Thus, it becomes possible to prevent the operation of the motor 27 from being in a fatal mode.

Alternatively, as shown in FIG. 9, the energized phases in the table Y may be arranged in such a failsafe usage order that the energized phase addresses are arranged in an inconsecutive order. In FIG. 9, all the energized phase addresses are exclusive (different) in case of one-bit garbling. That is, even when one bit is changed in an arbitrary one energized phase address, the changed energized phase address is different from all the other energized phase addresses. In this configuration, even in case that an abnormality causing the energized phase address to be incremented one-by-one, the energized phases are not switched in the correct order of driving the rotation of the motor 27. An operation of the motor 27 is prevented from falling into the fatal mode.

The arrangements of energized phases in any one of FIGS. 5 to 9 can be arbitrarily combined. For example, although the energized phases in the table Y illustrated in FIG. 9 are arranged in the correct order of driving the rotation of the motor 27, the energized phases may be arranged in the failsafe usage order illustrated in any one of FIGS. 5 to 8.

Moreover, in the present embodiment, the ROM of the by-wire control circuit 34 stores multiple kinds of tables X and multiple kinds of tables Y. For example, the table X and the table Y for a single-phase energization mode (method) for switching the energized phase by the single-phase energization mode, the table X and the table Y for a two-phase energization mode (method) for switching the energized phase by the two-phase energization mode, and the table X and the table Y for a single-phase-to-two-phases energization mode (method) for switching the energized phase by the single-phase-to-two-phases energization mode are stored.

The by-wire control circuit 34 switches the table X and the table Y between the tables X and the tables Y in accordance with a driving condition of the motor 27 (for example, battery voltage etc.). In another configuration, the engine ECU 18 may switch the drive permission code between multiple drive permission codes in accordance with the driving condition of the motor 27, and the by-wire control circuit 34 may switch the table X and the table Y according to the drive permission code.

Furthermore, in the present embodiment, the drive prohibition code and the tables X and Y for driving prohibition are set so that the address calculated based on the drive prohibition code is associated with energization of all phases or non-energization of all phases. Specifically, as shown in FIG. 10, the table X for drive prohibition is set so that the addresses calculated based on the drive prohibition code (e.g., "0xF00F") are all associated with energized phase addresses for drive prohibition. Furthermore, as shown in FIG. 11, the table Y for drive prohibition is set so that the energized phase addresses for drive prohibition are all associated with non-energization of all phases (energized phase pattern in which all phases are energization OFF). Alternatively, as shown in FIG. 12, the table Y for drive prohibition may be set so that the energized phase addresses for drive prohibition are all associated with energization of all phases (energized phase pattern in which all phases are energization ON).

The energized phase setting routine executed by the by-wire control circuit 34 of the SBW-ECU23 will be described with reference to FIG. 13. The energized phase setting routine shown in FIG. 13 is executed by the by-wire control circuit 34 at predetermined intervals during power on of the SBW-ECU 23. Upon starting this routine, at S101, the by-wire control circuit 34 first determines whether or not the drive permission code is received.

When it is determined at S101 that the drive permission code is not received (i.e., the drive prohibition code is received), the by-wire control circuit 34 determines the prohibition of driving of the motor 27 and ends this routine without executing S102 and subsequent steps.

When it is determined at S101 that the drive permission code is received (i.e., the drive prohibition code is not received), the by-wire control circuit 34 determines the permission of driving of the motor 27 and executes S102 and subsequent steps in the following way.

At S102, the by-wire control circuit 34 selects the table X and the table Y corresponding to the driving condition of the motor 27 (e.g., battery voltage etc.), from among the table X and the table Y for the single-phase energization mode, the table X and the table Y for the two-phase energization mode, and the table X and the table Y for the single-phase-to-two-phase energization mode. Thereby, the table X and the table Y are switched according to the driving condition of the motor 27. Alternatively, when the engine ECU 18 switches the drive permission code according to the driving condition of the motor 27, the table X and the table Y are switched according to the drive permission code.

Thereafter, at S103, the energized phase pattern No. is calculated. Specifically, when the motor 27 is rotated in the forward direction, the energized phase pattern No. is increased one-by-one. When the motor 27 is rotated in the reverse direction, the energized phase pattern No. is decreased one-by-one Thereafter, at S104, the address for access to the table X is calculated using the drive permission code, the energized phase pattern No., and a constant. An expression for this calculation is > the address=the energized phase pattern No.+the drive permission code+the constant.

The address calculation method can be modified in various ways. Based on the energized phase pattern No. and the drive permission code, the address may be calculated by one of or both of four arithmetic operations and a logical operation.

Thereafter, at S105, the energized phase address corresponding to the address calculated this time is calculated with reference to the table X. In this way, the energized phase address for access to the table Y in the correct order is calculated.

Thereafter, at S106, the energized phase corresponding to the energized phase address calculated this time is determined with reference to the table Y. Thereafter, at S107, the energized phase of the motor 27 is switched into the energized phase determined this time. Accordingly, the energized phase is switched in the correct order of driving the rotation of the motor 27.

In the present embodiment described above, the ROM of the by-wire control circuit 34 pre-stores the table X defining the energized phase address corresponding to each address, and the table Y defining the energized phase corresponding to each energized phase address. When receiving the drive permission code, the by-wire control circuit 34 calculates the address for access to the table X based on the drive permission code and the energized phase pattern No. Thereafter, by referring to the table X, the by-wire control circuit 34 calculates the energized phase address corresponding to the calculated address, thereby calculating the energized phase address for access to the table Y in the correct order. Thereafter, by referring to the table Y, the by-wire control circuit 34 determines the energized phase corresponding to the calculated energized phase address, thereby switching the energized phase in the correct order of driving the rotation of the motor 27.

In the above configuration, when the engine ECU 18 does not permit the driving of the motor 27, i.e., when the engine ECU 18 does not transmit the drive permission code to the by-wire control circuit 34, the by-wire control circuit 34 cannot calculate the address for access to the table X. Accordingly, the by-wire control circuit 34 cannot calculate the energized phase address for access to the table Y and thus cannot determines the energized phase and cannot drive the rotation of the motor 27. Therefore, it becomes possible to remarkably reduce a possibility that the rotation of the motor 27 is driven when the driving of the motor 27 is not permitted by the engine ECU 18 (when the drive permission code is not transmitted).

Moreover, in the above configuration, the energized phase address for access to the table Y in the correct order is calculated through referring to the table X. Thus, in case that an abnormality causing the increment of the energized pattern number one-by-one occurs due to a RAM garbling (data garbling due to RAM abnormality) or the like, it becomes possible to prevent the abnormality from causing the access to the table Y in the correct order. Therefore, in case that an abnormality causing the increment of the energized pattern number one-by-one occurs, it becomes possible to prevent the abnormality from switching the energized phase in the correct order of driving the rotation of the motor 27. Safety in case of system abnormality is improved.

In the present embodiment, the table Y is arrayed so that the energized phases 27 are arranged in a failsafe usage order (i.e., order for failsafe), which is different from the correct order for driving the rotation of the motor 27. In this configuration, in case that an abnormality causing the energized phase address to be incremented one-by-one, the energized phases are switched in the failsafe usage order and the operation of the motor 27 becomes an operation for failsafe. This prevents an operation of the motor 27 from falling into a fatal mode (e.g., mode which switches over the shift range).

Furthermore, in the present embodiment, based on the drive permission code and the energized phase pattern No., the by-wire control circuit 34 calculates the address by four arithmetic operations or a logical operation. This reduces a possibility that a correct address is accidentally calculated at a time of system failure. Therefore, the reliability improves as compared with cases where "0" or "1" is logically determined with a flag or the like.

In the present embodiment, the ROM of the by-wire control circuit 34 stores multiple kinds of tables X and multiple kinds of tables Y. In accordance with a driving condition of the motor 27 (e.g., battery voltage and the like), the by-wire control circuit 34 switches over between the tables X and between the tables Y. Alternatively, the engine ECU 18 may switch the drive permission code between multiple drive permission codes in accordance with the driving condition of the motor 27, and the by-wire control circuit 34 may switch over between the tables X or between the tables Y according to the drive permission code. This enables switching over between the tables X or between the tables Y according to the driving condition of the motor (e.g., battery voltage etc.) and switching a motor energization mode (e.g., single-phase energization mode, two-phase energization mode, a single-phase to two-phase energization mode).

Furthermore, in the present embodiment, the drive prohibition code, the table X and the table Y are set so that the address calculated based on the drive prohibition code is associated with energization of all phases or non-energization of all phases. In this configuration, even in case that during the prohibition of driving of the motor 27 by the engine ECU 18 (the drive prohibition code is transmitted), an abnormality causing the by-wire control circuit 34 to calculate the address based on the drive prohibition code occurs and the energized phase address is calculated based on this address and the phase address is determined, the motor 27 is maintained in the energization of all phases or the non-energization of all phases. Therefore, it becomes possible to prevent driving of the rotation of the motor 27.

In the above one example, the table Y is arrayed so that the energized phases are arranged in the failsafe usage order different from the correct order for driving the rotation of the motor 27. However, the table Y is not limited to this example. For example, the table Y may be arrayed so that the energized phases are arranged randomly.

Moreover, in the above one example, both the table X and the table Y are switched over according to the driving condition of the motor 27 or the drive permission code. However, this example does not limit embodiments. For example, to switch over the energization mode of the motor 27, at least one of the table X and the table Y may be switched over according to the driving condition of the motor 27 or the drive permission code may be switched over.

Moreover, in the above one example, the engine ECU 18 transmits the drive permission code and the drive prohibition code to the by-wire control circuit 34. However, this example does not limit embodiments. For example, a control circuit (e.g., AT-ECU 22 etc.) other than the engine ECU 18 may transmit the drive permission code and the drive prohibition code to the by-wire control circuit 34.

The above embodiment is directed to the shift by-wire system for performing the electrical control of the range switchover apparatus. However, this example does not limit embodiments. For example, a technical idea of the present disclosure is applicable to a system as long as the system drives rotation of a motor serving as a drive source by sequentially switching an energized phase of the motor. For example, a throttle by-wire system, a steering by-wire system, a brake by-wire system (a main brake by-wire system, a parking brake by-wire system) and the like may be embodiments of the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control apparatus comprising
a motor as a drive source of a vehicle-mounted apparatus;
a by-wire control circuit provided as a first control circuit for sequentially switching an energized phase of the motor to drive rotation of the motor;
a second control circuit for transmitting a drive permission code to the by-wire control circuit when driving of the rotation of the motor is permitted, wherein the by-wire control circuit and the second control circuit are different circuits,
wherein:
the by-wire control circuit pre-stores
a first table defining an energized phase address corresponding to each address and
a second table defining an energized phase corresponding to each energized phase address; and
when receiving the drive permission code, the by-wire control circuit switches the energized phase in a correct order of driving the rotation of the motor, by:
calculating an address for access to the first table based on the drive permission code;
calculating an energized phase address corresponding to the address by referring to the first table, thereby to calculate the energized phase address for access to the second table in the correct order; and
determining the energized phase corresponding to the energized phase address by referring to the second table; and
the second table is arrayed so that the energized phases are arranged in a failsafe usage order, which is different from the correct order of driving the rotation of the motor.

2. The motor control apparatus according to claim 1, wherein:
in the second table, the energized phases are arranged in the failsafe usage order so that energized phase patterns generally in anti-phase are adjacent to each other.

3. The motor control apparatus according to claim 1, wherein:
in the second table, the energized phases are arranged in the failsafe usage order so that the motor oscillates in forward and reverse directions.

4. The motor control apparatus according to claim 1, wherein:
in the second table, the energized phases are arranged in the failsafe usage order so that the motor slightly rotates in a safe-side direction.

5. The motor control apparatus according to claim 1, wherein:
in the second table, the energized phases are arranged in the failsafe usage order so that an all-phase-energization is inserted in the energized phases arranged in the correct order.

6. The motor control apparatus according to claim 1, wherein:
the second table is arrayed so that the energized phase addresses are arranged in an inconsecutive order.

7. The motor control apparatus according to claim 1, wherein:
based on the drive permission code and an energized phase pattern number, the by-wire control circuit calculates the address by at least one of: four arithmetic operations or a logical operation.

8. The motor control apparatus according to claim 1, wherein:
in accordance with a driving condition of the motor, the by-wire control circuit switches at least one of:
the first table between a plurality of the first tables; or
the second table between a plurality of the second tables.

9. The motor control apparatus according to claim 1, wherein:
the second control circuit switches the drive permission code between a plurality of the drive permission codes in accordance with a driving condition of the motor; and
in accordance with the drive permission code, the by-wire control circuit switches at least one of:
the first table between a plurality of the first tables; or
the second table between a plurality of the second tables.

10. The motor control apparatus according to claim 1, wherein:
the second control circuit transmits a drive prohibition code to the by-wire control circuit when the driving of the motor is prohibited; and
the drive prohibition code, the first table and the second table are set so that the address calculated based on the drive prohibition code is associated with energization of all phases or non-energization of all phases.

* * * * *